United States Patent [19]

Petrick

[11] Patent Number: 4,512,543
[45] Date of Patent: Apr. 23, 1985

[54] UNIVERSAL PRINTER STAND

[75] Inventor: David C. Petrick, Park Ridge, Ill.

[73] Assignee: Bretford Manufacturing, Inc., Schiller Park, Ill.

[21] Appl. No.: 424,403

[22] Filed: Sep. 27, 1982

[51] Int. Cl.³ .............................................. F16M 11/00
[52] U.S. Cl. ................................... 248/670; 248/673; 248/676; 248/172
[58] Field of Search ............... 248/670, 673, 676, 172, 248/173, 165, 188.1; 211/133, 175; 312/194; 108/137, 150

[56] References Cited

U.S. PATENT DOCUMENTS

| D. 252,388 | 7/1979 | Fjello-Jensen . | |
|---|---|---|---|
| 905,737 | 12/1908 | McCombe | 108/137 |
| 1,575,235 | 3/1926 | Tiffany . | |
| 1,931,118 | 10/1933 | Rowland . | |
| 2,004,536 | 6/1935 | Olson et al. | 248/670 X |
| 2,238,294 | 4/1941 | Scott et al. . | |
| 2,679,992 | 6/1954 | Schuette . | |
| 2,739,776 | 3/1956 | Terando . | |
| 2,749,071 | 6/1956 | Remstein . | |
| 3,559,592 | 2/1971 | Closa . | |
| 4,033,653 | 7/1977 | Doring et al. . | |
| 4,220,308 | 9/1980 | Strien et al. | 248/670 X |

OTHER PUBLICATIONS

"Office Products Dealer"; Jan. 1981; pp. 68-69.
Excerpt from *The Office,* Jul. 1981, pp. 184 and 185; Oct. 1980, p. 183.
Tiffany Stand & Furniture Co. Catalog, ©1981, p. 8, Printer Station No. 2130PS.

*Primary Examiner*—J. Franklin Foss
*Assistant Examiner*—David L. Talbott
*Attorney, Agent, or Firm*—Wood, Dalton, Phillips, Mason & Rowe

[57] ABSTRACT

A universal printer stand includes a platform having at least two parallel support members, at least two channel-shaped cross members transversely disposed on the support members and means disposed on the cross members for receiving the support legs of a printer. Means are provided for adjusting the receiving means to accommodate the lateral and longitudinal distances between the printer support legs. The receiving means includes a plurality of longitudinal slots in the cross members and cup-shaped members adjustably disposed in the slots. The cup-shaped members are adapted to receive the feet disposed on the legs of the printer, if the printer is so equipped. Alternatively, if the printer legs are in the form of threaded bolts, the bolts may be inserted through any of the longitudinal slots in the cross members so that the printer can be secured to the stand by nuts threaded onto the bolts.

20 Claims, 8 Drawing Figures

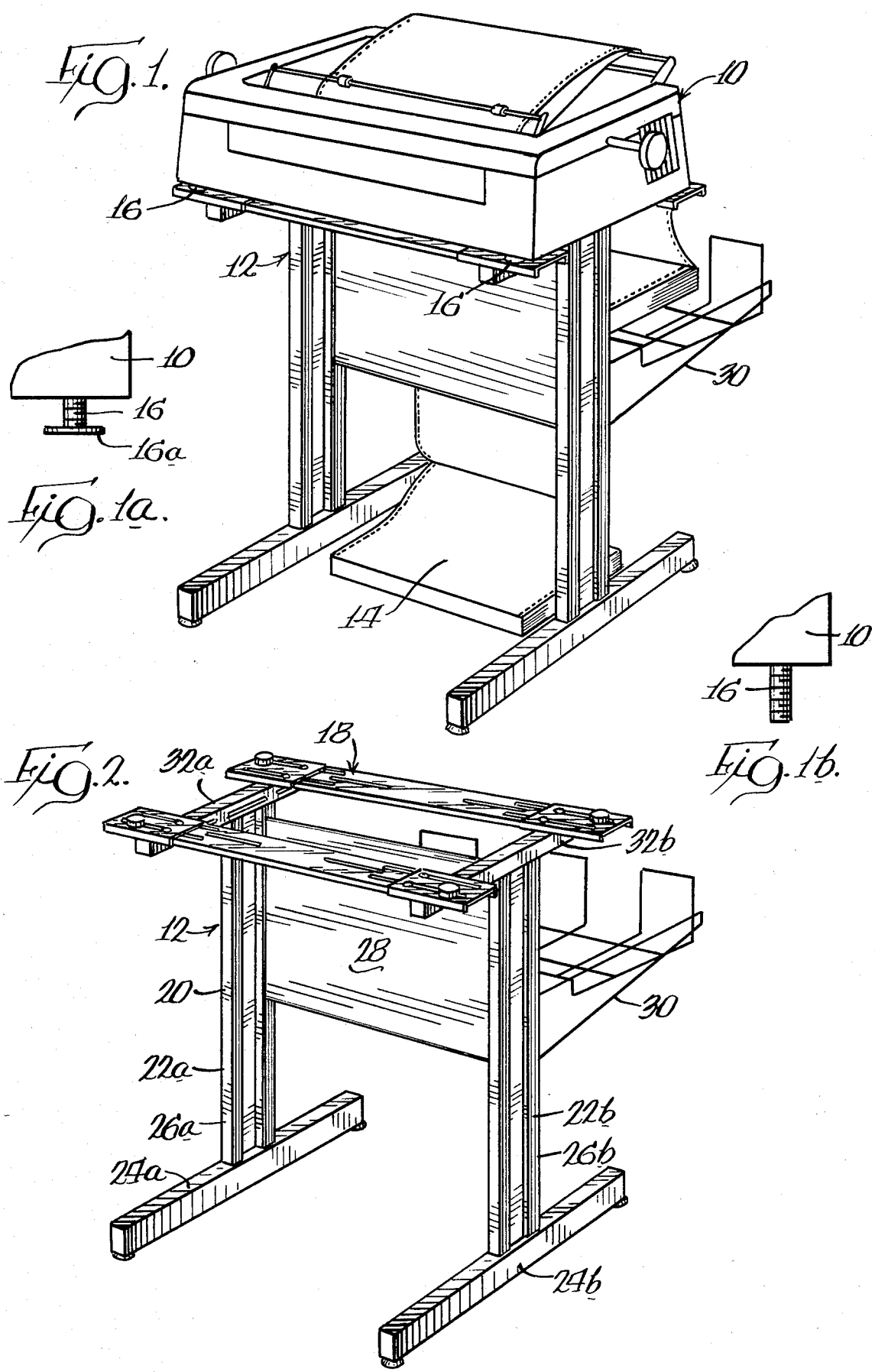

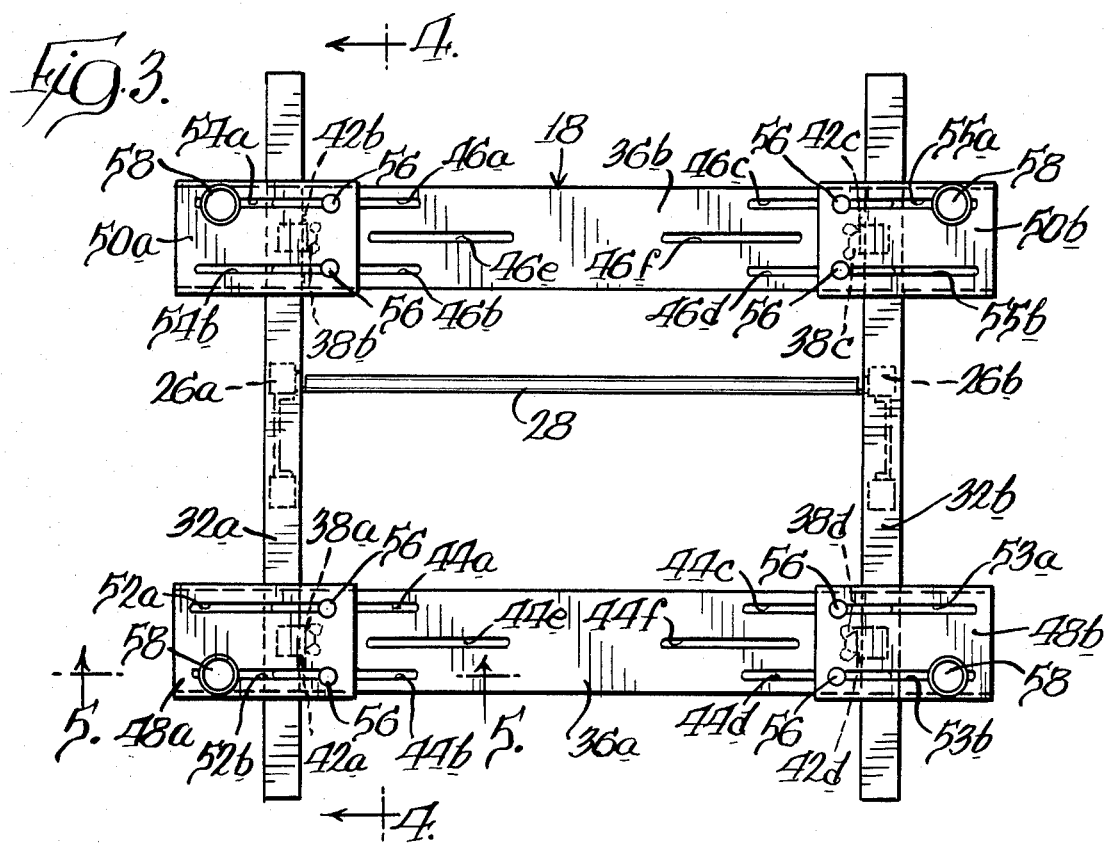
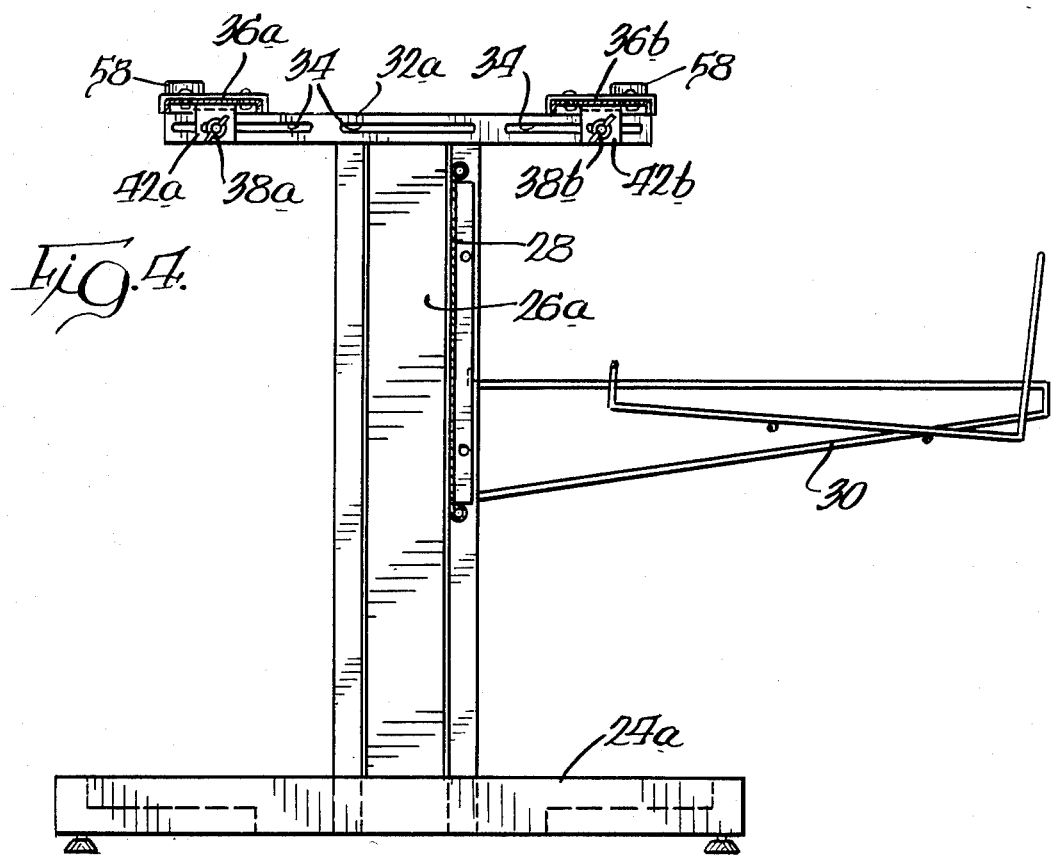

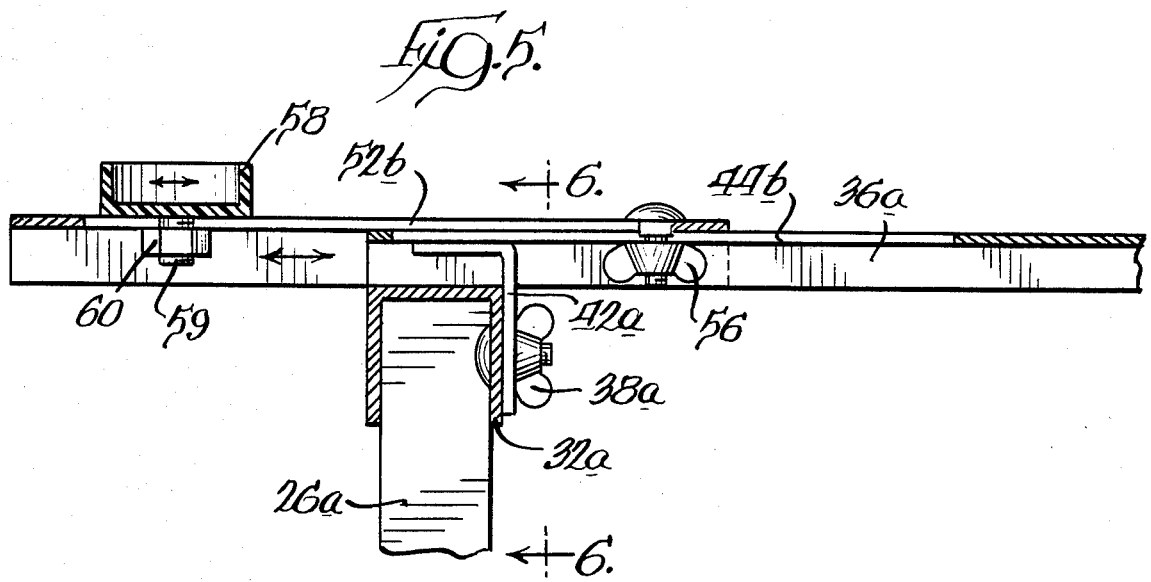
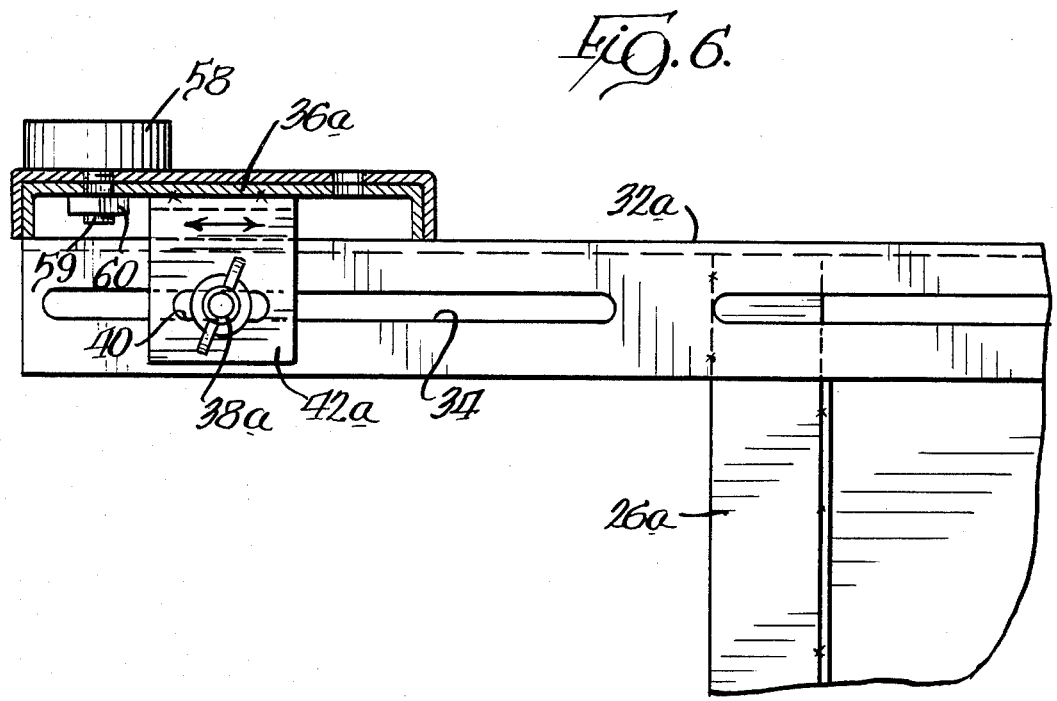

UNIVERSAL PRINTER STAND

BACKGROUND OF THE INVENTION

The present invention relates to printer stands, and more particularly to a stand for supporting any one of a number of printers each having support legs separated from one another by lateral and longitudinal distances which depend upon the particular printer to be supported.

Various types of printers are made and sold by the computer industry. These printers typically include a plurality of legs for supporting the printer atop a printer stand. Generally, the lateral and longitudinal spacing between the legs varies from manufacturer to manufacturer, thereby requiring stands to be custom-made for the particular type of printer.

Moreover, the support legs of some printers include feet while other types of printers include support legs in the form of threaded bolts which are intended to be secured to matching holes in the printer stand.

There is a need for a printer stand which will accommodate most, if not all of the printer types currently on the market. The printer stand should accommodate not only the variation in spacing between the legs of the printer, but should also be capable of accommodating the various types of leg supports including those with feet or those in the form of threaded bolts.

SUMMARY OF THE INVENTION

In accordance with the present invention, there is provided a universal printing stand which is adjustable to accommodate most, if not all, printer types now available on the market, and which is adaptable to receive the legs of these various types of printers whether the legs have attached feet or whether the legs are in the form of threaded bolts.

The universal printer stand of the present invention includes a base and a platform supported thereon having at least two parallel support members, at least two channel-shaped cross members transversely disposed on the support members and means disposed on the cross members for receiving the support legs of the printer. Means are provided for adjusting the receiving means to accommodate the lateral and longitudinal distances between the printer support legs.

The means for receiving the support legs of the printer includes a plurality of longitudinal slots disposed in the cross members for receiving legs in the form of threaded bolts. A plurality of cup-shaped members may be adjustably disposed in the longitudinal slots in the cross members. The cup-shaped members are adapted to receive the feet disposed on the legs of the printer, if the printer is so equipped.

In the event the longitudinal spacing of the printer legs exceeds that which can be accommodated on the cross members, a plurality of extender brackets may be utilized which will accommodate the extra spacing. In this case, the cup-shaped members may be secured to the extender brackets to receive the feet of the printer. Moreover, the extender brackets may be used even when the extra spacing is not required to increase the strength of the printer stand and allow the use of a lighter gauge metal, if desired, so as to reduce the overall cost and weight or gauge of materials.

BRIEF DESCRIPTION OF THE DRAWINGS

FIG. 1 is a perspective view of the printer stand of the present invention in conjunction with a conventional type of printer;

FIG. 1a is a fragmentary elevational view of a portion of the printer 10 illustrating one type of leg for the printer;

FIG. 1b is a fragmentary elevational view similar to FIG. 1a illustrating a different type of leg for the printer;

FIG. 2 is a view similar to FIG. 1 showing only the printer stand of the present invention;

FIG. 3 is a plan view of the printer stand shown in FIGS. 1 and 2 with the paper basket omitted for purposes of clarity;

FIG. 4 is a sectional view taken along line 4—4 of FIG. 3;

FIG. 5 is a partial sectional view taken along line 5—5 of FIG. 3; and

FIG. 6 is a partial sectional view taken along line 6—6 of FIG. 5.

DESCRIPTION OF THE PREFERRED EMBODIMENT

Referring to FIG. 1, there is illustrated a printer 10 in conjunction with the universal printer stand 12 of the present invention. The printer 10 may serve as the output device of a computer, word processor or similar device. As illustrated in FIG. 1, the printer 10 may utilize a stack of sheet-fed paper 14 upon which information is printed.

The printer 10 includes a plurality of legs 16 (only two of which are shown in FIG. 1) which support the printer 10 on the stand 12. As seen in FIG. 1a, the legs 16 may include feet 16a disposed on the ends thereof. The legs 16 may or may not be threaded into the underside of the printer 10.

Alternatively, the legs 16 may be in the form of a threaded shank or bolt, as shown in FIG. 1b, for secure attachment to the printer stand 12 by means of a nut, or the like, as noted more specifically below.

The longitudinal (side-to-side) and/or lateral (front-to-back) spacing between the legs 16 of the printer 10 may vary depending upon the type of printer to be supported by the stand 12. In order to accommodate this variation of spacing between the legs 16, the stand 12 includes an adjustable platform 18 with movable members to receive the legs 16.

Referring to FIGS. 2-4, the stand 12 also includes a base 20 comprising inverted T-shaped legs 22a, 22b which support the platform 18. Each of the T-shaped legs 22a, 22b includes transverse base supports 24a, 24b and upstanding members 26a, 26b, respectively, which are joined by welding or other suitable fastening means. Pads may be disposed on the bottom and on each end of the transverse supports 24a, 24b, if desired. A modesty panel 28 is fastened between the upstanding members 26a, 26b by screws or by other suitable fastening means to brace and to increase the structural integrity of the stand 12.

Secured to each of the upstanding members 26a, 26b is a paper basket 30 (not shown in FIG. 3) which is adapted to receive the printed paper 14 from the printer 10.

Disposed on the upper ends of the upstanding members 26a, 26b are a pair of lateral support members 32a, 32b which comprise a portion of the platform 18.

The support members 32a,32b may be welded to the upstanding members 26a,26b or may be joined thereto in another suitable fashion. Referring also to FIGS. 5 and 6 in the preferred embodiment, the support members 32a,32b are channel-shaped and similarly formed, each including three slots 34, (only the slots in the member 32a are shown in FIGS. 4 and 6), which slots are used to secure a pair of transverse longitudinal or cross members 36a,36b to the support members 32a,32b.

The similarly formed, longitudinal or cross members 36a,36b are secured to the support members 32a,32b by means of threaded bolts and nuts 38a–38d which, as shown in FIGS. 5 and 6, extend through one of the longitudinal slots 34 and through an elongate slot 40 disposed in one of a plurality of depending tabs 42a–42d secured on either side of an under surface of the cross members 36a,36b.

It can be seen that the mounting of the cross members 36a,36b by means of the bolts and nuts in the slots 34 permits the lateral spacing between the cross members 36a,36b to be adjusted to accommodate the varying lateral spacing between legs of different printers, as noted more specifically below.

The cross members 36a,36b are preferably channel-shaped in cross-section and include four longitudinal extender bracket mounting slots 44a–44d and 46a–46d, respectively, which are disposed adjacent the corners of the cross members 36a,36b. Also disposed in each of the cross members 36a,36b are a pair of longitudinal auxiliary mounting slots 44e,44f and 46e,46f, respectively, which extend along the longitudinal center line of the members 36a,36b parallel to the slots 44,46 and located a short distance on either side of a line midway between the ends of the members 36a,36b.

Nested atop each of the ends of the cross members 36a,36b is a channel-shaped extender bracket 48a,48b and 50a,50b, respectively. The extender brackets 48,50 each include a pair of longitudinal parallel slots, for example slots 52a,52b in the extender bracket 48a, FIG. 3, which are spaced apart by a distance equal to the distance between the slots 44a,44b on the longitudinal member 36a.

As seen in FIGS. 4 and 6, the extender brackets 48,50 are nestingly received on the longitudinal members 36 such that the slots in the extender brackets partially or fully overlie and are aligned with the corresponding extender bracket mounting slots 44a–44d and 46a–46d.

The extender bracket positions on the ends of the cross members may be adjusted by sliding the brackets over the cross members. The extender brackets 48,50 may then be secured to the cross members 36a,36b by means of threaded bolts and wing nuts 56 which extend through the aligned slots in the extender brackets and the cross members.

In the event that the legs of the printer take the form of a threaded bolt 16, such as shown in FIG. 1b, then the printer 10 may be secured to the printer stand 12 by adjusting the lateral spacing between the cross members 36a,36b as noted above, and by inserting the legs 16 through each of the auxiliary slots 44e,44f, 46e, 46f. A nut is then threaded onto the legs 16 to hold the printer 10 securely on the stand 12. Alternatively, the threaded legs 16 shown in FIG. 1b may be inserted into any of the slots 44a–44f and 46a–46f to accommodate substantially all printer types having varying lateral and longitudinal spacing between the legs 16 thereof.

When the legs 16 of the printer 10 include feet 16a, such as shown in FIG. 1a, then a number of cup-shaped receptacles 58 are used to receive and support the feet. The receptacles 58 are of a size sufficient to accommodate most, if not all, types of feet. The receptacles 58 are attached to the extender brackets 48,50 by means of a threaded bolt 59 which extends through a hole in the receptacle and through one of the slots 52–55 in the extender bracket where it is secured by a wing nut 60. The receptacles 58 are movable in the slots 52–55 in the brackets 48–50 when the wing nut 60 is loosened, thereby permitting the longitudinal spacing between receptacles to be further adjusted. It should be noted that the threaded bolts 59 may alternatively pass through not only one of the slots 52–55, but also through the aligned slots 44a–44d and 46a–46d, if desired, or simply through the slots 44,46, in which case the extender brackets need not be used.

It can therefore be seen that the slots 44,46 and the receptacles 58 together comprise means for receiving the support legs of the printer, whether the legs are of the form shown in FIG. 1a or that shown in FIG. 1b.

In summary, the lateral and longitudinal spacing between the cup-shaped receptacles 58 may be adjusted to accommodate substantially all printer types having feet 16a disposed on the end of the support legs 16 thereof. As previously noted, lateral spacing between the receptacles 58 may be varied by adjusting the placement of the cross members 36a,36b on the support members 32a,32b simply by loosening the wing nuts on the threaded bolts 38a–38d and by adjusting the position of the cross members 36a,36b. The nuts may then be retightened to maintain the position of the cross members 36a,36b on the support members 32a,32b.

An additional or alternate way of adjusting the lateral position of the receptacles 58 is by disposing the receptacles in slots other than the slots 52b,53b, 54a,55a. For example, the receptacles 58 may be disposed in any one of the remaining slots in the cross members 36a,36b and/or the extender brackets 48a,48b,50a,50b. A bolt 59 associated with a receptacle 58 may be inserted through any one of the slots in one of the extender brackets and/or through one of the slots in the cross members, if desired. Alternatively, the extender brackets 48,50 need not be used, in which case the bolts 59 would be inserted through one of the slots in the cross members 36a,36b. However, this can only be accomplished where the longitudinal spacing between the legs 16 of the printer 10 is not greater than the maximum spacing which can be accommodated on the cross members 36.

Longitudinal spacing may be adjusted by loosening the wing nuts on the bolts 56 and by sliding the extender brackets 48a–48d atop the cross members 36a,36b until the desired longitudinal spacing is achieved. It should be noted in this regard that the longitudinal spacing of the receptacles 58 mounted on the extender brackets 48a,48b need not be identical to the spacing between the receptacles 58 mounted on the extender brackets 50a,50b. The wing nuts may then be retightened onto the bolts 56 to hold the extender brackets 48,50 in place.

A further or alternate way of adjusting the longitudinal spacing between the receptacles 58 is by loosening the nuts 60 and by adjusting the position of the receptacles themselves within the slots 52b,53b,54a, 55a. The nuts 60 may then be retightened on the bolt 59 to maintain the position of the receptacles 58.

Where the longitudinal spacing between the legs 16 is less than the longitudinal spacing which can be accommodated by the cross members 36 alone, the extender brackets 48,50 may also be used to increase the strength of the platform 18, in which case the bolts 59 associated with the receptacles 58 would be inserted through the aligned slots in the extender bracket and the cross members 36. This will permit the use of a lighter gauge metal, if desired, so as to reduce the overall cost and weight of the finished product.

It should be noted that the receptacles 58 are capable of receiving types of feet other than that shown in FIG. 1a. For example, the feet 16a may be a pad, a cylindrical piece of rubber or any other configuration. In each case, the lateral and longitudinal spacing of the receptacles 58 are adjusted so that the feet 16a are received firmly therein such that the printer is accommodated on the platform 18.

The adjustability of the platform 18 allows various types of printers to be supported thereby, with the advantage that little or no portion of the platform 18 extends outwardly from the printer, thereby minimizing the risk of a person accidentally bumping or otherwise contacting the stand itself.

I claim:

1. A universal printer stand for supporting any one of a number of printer types each having support legs separated from one another by lateral and longitudinal distances which depend upon the particular type of printer to be supported, comprising: a platform having a pair of spaced support members and a pair of spaced cross members secured to and transversely disposed with respect to the support members to afford an upper platform surface; receiving means disposed on the cross members for supporting the legs of the printer including extender brackets disposed on each of the cross members; means for adjusting the receiving means to accommodate the lateral and longitudinal distances between the printer support legs; and means for supporting the platform such means being positioned below the upper platform surface and being in noninterfering relationship with the adjusting means.

2. The universal printer stand of claim 1, wherein the receiving means includes a plurality of longitudinal slots in the cross members for accepting the printer legs.

3. The universal printer stand of claim 1, wherein the receiving means includes a plurality of longitudinal slots and a plurality of receptacles positioned in the slots, each receptacle being positioned to accept a printer leg.

4. The universal printer stand of claim 1, wherein each extender bracket and each cross member have aligned slots, and means are provided extending through the aligned slots for securing the extender brackets in adjusted position to the cross members.

5. The universal printer stand of claim 4, wherein the extender brackets include longitudinal slots for accepting the printer legs.

6. The universal printer stand of claim 4, wherein the extender brackets include longitudinal slots and a plurality of receptacles adjustably positioned in the longitudinal slots, each receptacle being positioned to accept the feet of a printer leg.

7. The universal printer stand of claim 1 wherein the adjusting means includes a plurality of elongate slots disposed in each of the support members and means extending through the elongate slots for securing the cross members at desired positions on the support members.

8. A universal printer stand for supporting one of various types of printers having legs separated from one another by lateral and longitudinal distances which depend upon the particular type of printer to be supported, comprising:

a platform having an upper platform surface and first and second spaced parallel support members each having a plurality of elongate slots therein and first and second spaced parallel, channel-shaped cross members extending transversely of the support members and having cup-shaped receptacles each for receiving a printer leg;

means extending through the elongate slots for securing the cross members in adjustable positions with respect to the support members to vary the lateral spacing of the receptacles;

adjustable means for each receptacle to position each receptacle longitudinally to receive a printer leg;

a base for supporting the platform, the base terminating at its upper end at a position below the upper platform surface so that the cross members can be secured in adjustable positions without interference from the base; and a channel-shaped extender bracket nestingly disposed atop an end of each of the cross members, each extender bracket including slots aligned with the longitudinal slots in the cross members and being adjustably secured to the cross members to accommodate the receptacles and to vary the length of the cross members.

9. A printer stand for supporting any one of a number of printer types each having support legs separated from one another by lateral and longitudinal distances which depend upon the particular type of printer, comprising:

a base member having a pair of upright legs each including an upper end portion;

a laterally extending support member disposed on each upper end portion, each support member having a first aperture and a laterally spaced second aperture for lateral adjustment of the stand;

a first cross member extending longitudinally between the support members and having means for adjusting the lateral position of the first cross member on the support members including two mounting apertures each aligned with one of the first apertures of the support members and securing means extending through the aligned first and mounting apertures for securing the first cross member to the support members in a first desired lateral position;

a second cross member laterally spaced from the first cross member, said second cross member extending longitudinally between the support members and having means for adjusting the lateral position of the second cross member on the support members including two mounting apertures each aligned with one of the second apertures of the support members and securing means extending through the aligned second and mounting apertures for securing the second cross member to the support members in a second desired lateral position and;

adjustable receiving means disposed in the first and second cross members for supporting the legs of the printer and providing longitudinal adjustment corresponding to the longitudinal distance between the legs of the printer, the adjustable receiving means including;

first and second pairs of slots disposed on either side of a line midway between the two ends of the cross member, the support legs of the printer extending through selected ones of the slots.

10. A printer stand for supporting printers of various types having support legs separated from one another by lateral and longitudinal distances which depend upon the particular type of printer, comprising:
   a base member having a pair of upright legs;
   a support member disposed on each of the upright legs and extending laterally in a horizontal plane;
   first and second cross members secured on the support members and extending longitudinally therebetween, the cross members being spaced from one another by a desired lateral distance and each including two end portions; and
   a pair of slots in each end portion of each cross member, each printer support leg being supported by one slot of a particular pair of slots wherein each pair of slots includes a first slot adjacent an end of the cross member and a second slot parallel to the first slot and offset with respect thereto so that the second slot is farther from the end of the cross member than the first slot.

11. A printer stand for supporting printers of various types having support legs separated from one another by lateral and longitudinal distances which depend upon the particular type of printer, comprising:
   a base member having a pair of upright legs;
   a support member disposed on each of the upright legs and extending laterally in a horizontal plane;
   first and second cross members secured on the support members and extending longitudinally therebetween, the cross members being spaced from one another by a desired lateral distance and each including two end portions;
   a pair of slots in each end portion of each cross member, each printer support leg being supported by one slot of a particular pair of slots; and
   an extender bracket disposed over each end of each cross member and having an upper surface for supporting a printer, each extender bracket having a pair of slots aligned with the pair of slots in the cross member and further including bolts extending through the aligned slots to secure the extender brackets to the cross members in longitudinally adjustable position, the base terminating at its upper end at a position below each upper surface of the extender brackets so that the extender brackets can be secured in the adjustable positions without interference from the base member.

12. In a universal printer stand having a supporting base for accommodating any one of a number of printer types each having support legs separated from one another by lateral and longitudinal distances which depend upon the particular type of printer to be supported, a printer stand supporting platform mounted on the base, comprising:
   a pair of spaced support members mounted on the top portion of the base;
   a first cross member extending between the support members;
   a second cross member spaced longitudinally of the first cross member and extending between the support members,
   one of said cross members being adjustably secured to the support members for movement longitudinally of the support members; and
   an extender bracket adjustably secured to an end portion of each of said cross members for selectively varying the length of said cross members to accommodate any one of a plurality of said printer types, each extender bracket having an upper surface for supporting a printer, said base terminating in a position below the upper surface of each extender bracket so that the base does not interfer with the extender bracket adjustment.

13. The printer stand supporting platform of claim 12, wherein an extender bracket is adjustably secured to the other end portion of each of the cross members.

14. The printer stand supporting platform of claim 13, in which cooperative guide portions are provided on the extender brackets and cross members for guiding each extender bracket during movement between adjustable positions.

15. The printer stand supporting platform of claim 13, wherein each of the extender brackets lie in substantially the same plane.

16. The printer stand supporting platform of claim 12, further including means disposed on the extender brackets for receiving the support legs of the printer.

17. The printer stand supporting platform of claim 12, wherein slots are disposed in the cross members and in the extender brackets and further including means extending through the slots for securing the extender brackets to the cross members in fixed relation thereto.

18. The printer stand supporting platform of claim 13, in which the free end of each extender bracket after adjustment lies within the periphery of the printer being supported.

19. The printer stand supporting platform of claim 13, further including means disposed on the extender brackets for receiving the support legs of the printer.

20. The printer stand supporting platform of claim 13, wherein slots are disposed in the cross members and in the extender brackets and further including means extending through the slots for securing the extender brackets to the cross members in fixed relation thereto.

* * * * *

UNITED STATES PATENT AND TRADEMARK OFFICE
CERTIFICATE OF CORRECTION

PATENT NO. : 4,512,543
DATED : April 23, 1985
INVENTOR(S) : David C. Petrick

It is certified that error appears in the above-identified patent and that said Letters Patent is hereby corrected as shown below:

Claim 1, column 5, line 36, after "platform" insert --,--.

Claim 9, column 6, line 66, after "including" delete ";".

Claim 12, column 8, line 7, delete "longitudinally" and substitute therefor --laterally--;

column 8, lines 11 and 12, delete "longitudinally of" and substitute therefor --laterally along--; and column 8, line 20, delete "interfer" and substitute therefor --interfere--.

Signed and Sealed this

Twenty-third Day of September 1986

[SEAL]

Attest:

DONALD J. QUIGG

Attesting Officer

Commissioner of Patents and Trademarks